(12) United States Patent
Du et al.

(10) Patent No.: US 10,308,782 B2
(45) Date of Patent: Jun. 4, 2019

(54) POLYDIMETHYLSILOXANE GRAFTED POLYETHYLENE FOAM

(71) Applicant: Dow Global Technologies LLC, Midland, MI (US)

(72) Inventors: Zhe Du, Shanghai (CN); Cheng Chen, Shanghai (CN); David Hong Fei Guo, Shanghai (CN); Dachao Li, Royersford, PA (US); Gangwei Sun, Shanghai (CN); Jianxin Zhang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 50 days.

(21) Appl. No.: 15/324,770

(22) PCT Filed: Aug. 15, 2014

(86) PCT No.: PCT/CN2014/084473
§ 371 (c)(1),
(2) Date: Jan. 9, 2017

(87) PCT Pub. No.: WO2016/023218
PCT Pub. Date: Feb. 18, 2016

(65) Prior Publication Data
US 2017/0204239 A1    Jul. 20, 2017

(51) Int. Cl.
*C08J 9/12* (2006.01)
*H01B 3/44* (2006.01)
*H01B 3/46* (2006.01)
*C08J 9/00* (2006.01)

(52) U.S. Cl.
CPC ............ *C08J 9/122* (2013.01); *C08J 9/0061* (2013.01); *H01B 3/441* (2013.01); *H01B 3/46* (2013.01); *C08J 2201/032* (2013.01); *C08J 2203/06* (2013.01); *C08J 2207/06* (2013.01); *C08J 2323/06* (2013.01); *C08J 2351/06* (2013.01); *C08J 2387/00* (2013.01)

(58) Field of Classification Search
CPC .............................. C08F 255/02; C08F 9/122
See application file for complete search history.

(56) References Cited

U.S. PATENT DOCUMENTS

| | | | |
|---|---|---|---|
| 3,555,109 A * | 1/1971 | Getson | C08F 283/122 522/172 |
| 3,865,897 A * | 2/1975 | Falender | C08L 23/02 525/100 |
| 4,544,681 A * | 10/1985 | Lee | C08J 9/0061 521/134 |
| 5,574,074 A | 11/1996 | Zushi et al. | |
| 5,994,420 A | 11/1999 | Gusavage et al. | |
| 6,090,902 A * | 7/2000 | Kuo | C08F 290/04 526/279 |
| 6,214,746 B1 | 4/2001 | Leung et al. | |
| 6,787,580 B2 | 9/2004 | Chonde et al. | |
| 6,790,870 B1 | 9/2004 | DeSimone et al. | |
| 2002/0127389 A1* | 9/2002 | Hanada | B32B 5/18 428/319.9 |
| 2008/0166537 A1 | 7/2008 | Frankowski et al. | |
| 2010/0000604 A1 | 1/2010 | Moineau et al. | |
| 2010/0317786 A1 | 12/2010 | Moad et al. | |
| 2011/0190411 A1 | 8/2011 | Backer et al. | |
| 2012/0245243 A1 | 9/2012 | Lindner et al. | |
| 2012/0283362 A1 | 11/2012 | Backer et al. | |
| 2015/0248527 A1 | 9/2015 | Cao et al. | |
| 2015/0307808 A1* | 10/2015 | Stammer | C10M 171/002 508/208 |

FOREIGN PATENT DOCUMENTS

| | | | |
|---|---|---|---|
| CA | 2523861 | A1 | 11/2004 |
| CN | 1908053 | A | 2/2007 |
| CN | 101633757 | A | 1/2010 |
| CN | 103865173 | A | 6/2014 |
| JP | 1986296040 | | 12/1986 |
| JP | S61296040 | A | 12/1986 |
| JP | 1990102283 | | 4/1990 |
| JP | H02102283 | A | 4/1990 |
| JP | 2004307642 | A | 11/2004 |
| JP | 2006022276 | A | 1/2006 |

OTHER PUBLICATIONS

Machine translation of JP 2011-00662 by Kikuchi et al (Year: 2011).*
Machine translation of CN 1334186 by Li et al (Year: 2002).*
"Foaming Plastics with Inert Gases" by Praller, A. Kunststoffe plast. europe. 2005. (Year: 2005).*
"Novel Synthesis of Polyethylene—Poly(dimethylsiloxane) Copolymers with a Metallocene Catalyst". A. Ciolino et al. J. Polymer Science part A, vol. 42, pp. 2462-2473 (Year: 2004).*
Machine translation of JP 02102283A by Inoue et al. (Year: 1990).*
Bayraktar, "Gradient blending of poly(dimethylsiloxane) with polystyrene and polyethylene in supercritical carbon dioxide", J. of Supercritical Fluids, 2008, 44, 48-61.
PCT/CN2014/084473 International Search Report and Written Opinion dated Jun. 1, 2015.
PCT/CN2014/084473, International Preliminary Report on Patentability dated Mar. 2, 2017.
Dow Global Technologies LLC, EP Appln. No. 14899628.3-1102, Rejection dated Mar. 22, 2018.

* cited by examiner

*Primary Examiner* — Michael M Dollinger
*Assistant Examiner* — Christina H Wales

(57) ABSTRACT

In one aspect there is provided a foam comprising: a polymeric matrix comprising polyethylene grafted polymerized siloxane, and a plurality of cells formed in the polymeric matrix and containing a blowing agent comprising carbon dioxide. In another aspect there is provided a method of making a foam comprising: grafting polymerized siloxane to polyethylene to form a grafted intermediate; molding the grafted intermediate to form a molded intermediate; and foaming the molded intermediate using high-pressure $CO_2$ to form the foam, wherein the foam has a porosity greater than 75%.

6 Claims, No Drawings

POLYDIMETHYLSILOXANE GRAFTED POLYETHYLENE FOAM

BACKGROUND OF THE INVENTION

Foams have a variety of applications. In one instance, radio frequency cables (referred to herein as RF cables) include insulation to improve cable performance. One type of RF cable is coaxial cable which includes insulation between the inner conductor and the outer conductor. In one instance, this insulation is a foam.

In the telecommunications industry, the recent trend is that the data frequency transmitted on RF cables has increased over time. Currently, it is common to transmit data using a frequency of between 2.5 and 2.6 GHz, which corresponds to the 4G spectrum. It is anticipated that frequencies will continue to increase over time.

When transmitting data on an RF cable, the loss-rate of energy is referred to as the dissipation factor (DF). Increasing the porosity of the insulation of the RF cable is one way to reduce DF. Porosity is a measure of the void, or empty spaces, in the insulation, and is generally measured as the ratio of the volume of voids to the total volume of the foam.

One way to reduce DF is to provide an insulator having high porosity, such as one formed from a highly foamed dielectric made with polymer resins which are as pure as possible, wherein the foam includes minimal polar groups attached to the polymer and minimum polar additives.

Foams are typically formed using a blowing agent. The blowing agent serves to form bubbles in the polymeric material. Some blowing agents will leach into the polymeric material and will become impurities in the foam. Some blowing agents have adverse environmental impact, such as halohydrocarbons. Some blowing agents require use of a nucleating agent to expedite bubble formation, and these nucleating agents can become impurities in the foam and can increase the costs of producing the foam.

A foam is desired which has a low DF. Such a foam will preferably have minimal impurities. Such a foam will preferably be compatible with a blowing agent which does not add impurities to the foam and requires little or no nucleating agent.

SUMMARY OF THE INVENTION

In one aspect there is provided a foam comprising: a polymeric matrix comprising polyethylene grafted polymerized siloxane, and a plurality of cells formed in the polymeric matrix and containing a blowing agent comprising carbon dioxide.

In another aspect there is provided a method of making a foam comprising: grafting polymerized siloxane to polyethylene using Haake or extrusion to form a grafted intermediate; blending the grafted intermediate with a PE resin to form a blended intermediate; molding the blended intermediate to form a molded intermediate; and foaming the molded intermediate using high-pressure $CO_2$ to form the foam, wherein the foam has a porosity greater than 75%.

DETAILED DESCRIPTION OF THE INVENTION

As used herein, unless otherwise designated, molecular weight of a polymer refers to the weight average molecular weight.

The present disclosure describes an improved foam and method for making the same. A foam is a substance that is formed by trapping pockets of gas in a medium, which pockets of gas are provided by a blowing agent, as described in greater detail herein. As used herein, the medium is preferably formed from a polymeric matrix, as described in greater detail herein. Preferably, the foam is a closed-cell foam. A closed-cell foam is a foam where the pockets of gas are enclosed in individual cells formed from the polymeric matrix. The cells are defined by walls formed from the polymeric matrix, wherein the gas is captured in the cells.

The polymeric matrix is preferably formed from polyethylene grafted polymerized siloxane. Polymerized siloxane, as used herein, refers to a variety of siloxane-based polymers having repeating units based on Formula (I):

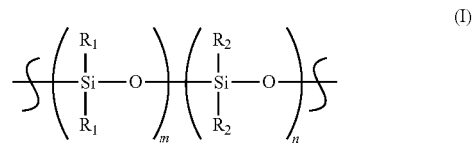

where:

$R_1 = CH_3$; or $C_2H_5$;

$R_2 = CH_3$; or $C_2H_5$;

m=0-500; and n=0-500.

In one instance, the polymerized siloxane of Formula (I) includes end units as detailed by Formula (II)

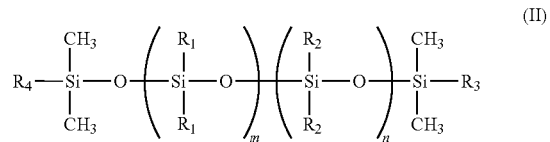

where:

$R_3 = CH=CH_2$, $C_4H_9$, $C_2H_5$ or

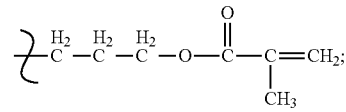

$R_4 =$

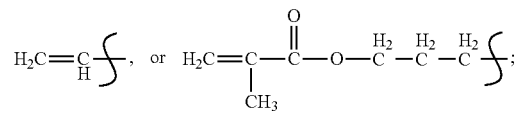

In one instance, a suitable polymerized siloxane is a vinyl-terminated diethylsiloxane-dimethylsiloxane copolymer having the Formula (III)

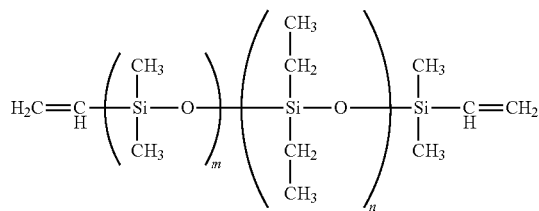

(III)

where:

m=77-185; and n=17-52.

The mole percent of diethylsiloxane of Formula (III) is from 18 to 22 percent and the specific gravity is 0.953, and is available from Gelest, Inc. under the name EDV-2022 In one instance, the molecular weight of the diethylsiloxane is from 8000 to 20000.

In another instance, a suitable polymerized siloxane is monomethacryloxypropyl terminated polydimethylsioxane having the Formula (IV)

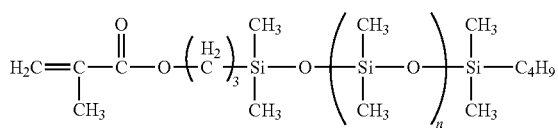

(IV)

where:

n=9-124.

The polymerized siloxane of Formula (IV) has a molecular weight of 1000-10000 and a specific gravity of 0.96-0.97, and is available from Gelest, Inc. under the name MCR-M07-M22.

In another instance, a suitable polymerized siloxane is monovinyl terminated polydimethylsiloxane having the Formula (V)

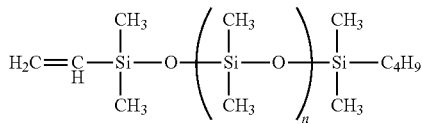

(V)

where:

n=67-445.

The polymerized siloxane of Formula (V) has a molecular weight of 5500-35000 and a specific gravity of 0.97-0.98, and is available from Gelest, Inc. under the name MCR-V21-V41

In another instance, a suitable polymerized siloxane is asymmetric monomethacryloxypropyl terminated polydimethylsiloxane having the Formula (VI)

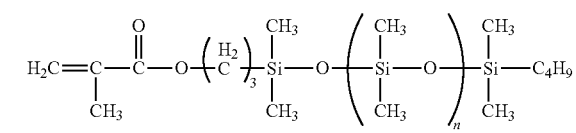

(VI)

where:

n=60.

The polymerized siloxane of Formula (VI) has a molecular weight of 5000 and a specific gravity of 0.97, and is available from Gelest, Inc. under the name MCR-M17

In another instance, a suitable polymerized siloxane is symmetric methacryloxypropyl terminated polydimethylsiloxane having the Formula (VII)

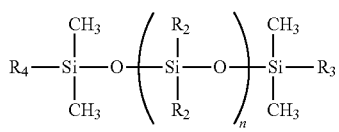

(VII)

where:

n=8-130;

$R_3=$

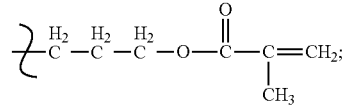

and $R_4=$

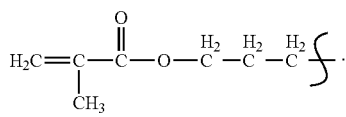

The polymerized siloxane of Formula (VII) has a molecular weight of 1000-10000 and a specific gravity of 0.98, and is available from Gelest, Inc. under the name DMS-R18.

The polymerized siloxane is grafted to polyethylene to form polyethylene grafted polymerized siloxane. Either low density or high density polyethylene is suitable for use as the polyethylene. Many commercially available polyethylenes are suitable for use herein. In one instance, a high density polyethylene is selected having a density of 0.965 g/cm$^3$, melt mass flow of 8.0 g/10 min, and a melt temperature of 133° C. and is available from The Dow Chemical Company under the trade name DGDA-6944. In one instance, a low density polyethylene is selected having a density of 0.919 g/cm$^3$, melt mass flow of 1.8 g/10 min, and a melt temperature of 110° C. and is available from The Dow Chemical Company under the trade name DFDA-1253. A graft polymer is a copolymer having a backbone formed from one polymer and branches formed from another polymer. In one instance, polyethylene is selected as the backbone and polymerized siloxane is selected as the branches. It is understood that a branched polyethylene, such as high density polyethylene, may be selected as the backbone to which the branches are grafted. In one instance, the polymeric matrix is from 0.5 to 10 mole percent polymerized siloxane by weight. In one instance, the polymeric matrix is from 1 to 5 mole percent polymerized siloxane by weight. In some instances, grafting produces different properties in the resulting foam as compared to other combination techniques.

The polymeric matrix is formed into a foam through the use of a blowing agent. Preferably, the blowing agent is carbon dioxide ($CO_2$). In one instance, the polymeric matrix is foamed by placing the polymeric matrix in a vessel with $CO_2$ at a temperature above ambient and a pressure above ambient followed by rapidly lowering the pressure of the vessel. In one instance, the blowing agent is super-critical $CO_2$. The critical pressure for $CO_2$ is 7.4 MPa. In one instance, the desired pressure in the vessel is from 25 to 35 MPa. In one instance, the desired temperature in the vessel is from 95° C. to 105° C. for the polymeric matrix where low density polyethylene forms to the backbone. In one instance, the desired temperature in the vessel is from 111° C. to 130° C. for the polymeric matrix where high density polyethylene forms to the backbone. In one instance, the resulting foam has a porosity greater than 70 percent. In one instance, the resulting foam has a porosity greater than 75 percent. In one instance, the resulting foam has a porosity greater than 80 percent. In one instance, the cell size of the foam is less than 15 μm. In one instance, the cell size of the foam is less than 10 μm.

In another aspect there is provided a method of making a foam comprising: grafting polymerized siloxane to polyethylene using Haake or extrusion to form a grafted intermediate; blending the grafted intermediate with a polyethylene resin to form a blended intermediate; molding the blended intermediate to form a molded intermediate; and foaming the molded intermediate using high-pressure $CO_2$ to form the foam.

In another aspect there is provided a method of making a foam comprising: grafting polymerized siloxane to polyethylene using Haake or extrusion to form a grafted intermediate; molding the grafted intermediate to form a molded intermediate; and foaming the molded intermediate using high-pressure $CO_2$ to form the foam.

EXAMPLES

In Comparative Examples A through D, a foam is prepared from pure polyethylene pellets. As used herein, pure polyethylene refers to either a high density or a low density polyethylene which has not been blended or grafted with another polymer. As used herein, pure polyethylene may include trace amounts of other compounds, but preferably contains greater than 99% polyethylene. The pellets are prepared by adding the resin identified in Table I to a 50 cubic centimeter Haake mixer (available from Thermo Scientific as HAAKE Polylab OS) having two sigma rotors rotating in opposite directions. The mixer blends the material at 180° C. for 8 minutes at 60 rpm. The resulting material is withdrawn from the mixer and cut into pellets. The pellets formed according to these Examples are subsequently formed into a polymer plate and then a foam as described herein.

TABLE I

| Example | Polymer Resin | Producer | Product Specifications |
|---|---|---|---|
| Comparative Example A | 100% HDPE | The Dow Chemical Company | Grade: DGDA-6944; MFR (190° C./2.16 kg): 8.0 g/10 min |
| Comparative Example B | 100% HDPE | The Dow Chemical Company | Grade: DGDA-6944; MFR (190° C./2.16 kg): 8.0 g/10 min |
| Comparative Example C | 100% LDPE | The Dow Chemical Company | Grade: DFDA-1253, MFR (190° C./2.16 kg): 1.8 g/10 min |
| Comparative Example D | 100% HDPE | The Dow Chemical Company | Grade: DGDA-6944; MFR (190° C./2.16 kg): 8.0 g/10 min |

In Comparative Examples E through H, a foam is prepared from a blend of high density polyethylene and polymerized siloxane. The pellets are prepared by adding the polymer resin blend identified in Table II (percentages are by weight) to a 50 cubic centimeter Haake mixer (available from Thermo Scientific as HAAKE Polylab OS) having two sigma rotors rotating in opposite directions. The HDPE used in these Examples is the same as is used in Comparative Examples A through D as described in Table I. The mixer blends the material at 180° C. for 8 minutes at 60 rpm. The resulting material is withdrawn from the mixer and cut into pellets. The pellets formed according to these Examples are subsequently formed into a polymer plate and then a foam as described herein.

TABLE II

| Example | Polymer Resin Blend | Producer (polymerized siloxane) | Product Specifications (polymerized siloxane) |
|---|---|---|---|
| Comparative Example E | 98% HDPE/ 2% MCR-M17 | Gelest Co. Ltd | MW = 5000, Mono-Methacryloxypropyl Terminated |
| Comparative Example F | 98% HDPE/ 2% DMS-R18 | Gelest Co. Ltd | MW = 5000, symmetric Methacryloxypropyl Terminated |
| Comparative Example G | 98% HDPE/ 2% MCR-M22 | Gelest Co. Ltd | MW = 10000, Mono-Methacryloxypropyl Terminated |
| Comparative Example H | 98% HDPE/ 2% MCR-V21 | Gelest Co. Ltd | MW = 5500, MonoVinylTerminated |

In Comparative Examples I and J, a foam is prepared from a blend of high density polyethylene and peroxide L-101. The pellets are prepared by adding the materials identified in Table III (percentages are by weight) to a 50 cubic centimeter Haake mixer (available from Thermo Scientific as HAAKE Polylab OS) having two sigma rotors rotating in opposite directions. The HDPE used in these Examples is the same as is used in Comparative Examples A through D as described in Table I. The mixer blends the material at 180° C. for 8 minutes at 60 rpm. The resulting material is withdrawn from the mixer and cut into pellets. The pellets formed according to these Examples are subsequently formed into a polymer plate and then a foam as described herein.

TABLE III

| Example | Material | Producer (L-101) | Product Specifications (L-101) |
|---|---|---|---|
| Comparative Example I | 99.9% HDPE/ 0.1% L-101 | Arkema Co. Ltd. | 2,5 dimethyl-2,5-di-(tert-butylperoxy) hexane (sold as Luperox L-101 Peroxide; CAS: 78-63-7; hereinafter referred to as L-101) |
| Comparative Example J | 99.9% HDPE/ 0.1% L-101 | Arkema Co. Ltd. | |

In Examples A through D, a foam is prepared from polymerized siloxane grafted high density polyethylene. The pellets are prepared by adding the materials identified in Table IV (percentages are by weight) to a 50 cubic centimeter Haake mixer (available from Thermo Scientific as HAAKE Polylab OS) having two sigma rotors rotating in opposite directions. The HDPE used in these Examples is the same as is used in Comparative Examples A through D as described in Table I. The L-101 used in these Examples is the same as is used in Comparative Examples I and J as described in Table III. The mixer blends the material at 180° C. for 8 minutes at 60 rpm, thereby producing high density polyethylene grafted with polymerized siloxane. The resulting material is withdrawn from the mixer and cut into pellets. The pellets formed according to these Examples are subsequently formed into a polymer plate and then a foam as described herein.

TABLE IV

| Example | Material | Producer (polymerized siloxane) | Product Specifications (polymerized siloxane) |
|---|---|---|---|
| Example A | 97.9% HDPE, 2% MCR-M17, 0.1% L-101 | Gelest Co. Ltd | MW = 5000, Mono-Methacryloxypropyl Terminated |
| Example B | 97.9% HDPE, 2% DMS-R18, 0.1% L-101 | Gelest Co. Ltd | MW = 5000, symmetric Methacryloxypropyl Terminated |
| Example C | 97.9% HDPE, 2% MCR-M22, 0.1% L-101 | Gelest Co. Ltd | MW = 10000, Mono-Methacryloxypropyl Terminated |
| Example D | 97.9% HDPE, 2% MCR-V21, 0.1% L-101 | Gelest Co. Ltd | MW = 5500, MonoVinylTerminated |

In Examples E and F, a foam is prepared from a blend of polymerized siloxane grafted high density polyethylene and high density polyethylene. The pellets are prepared by adding the materials identified in Table V (percentages are by weight) to a 50 cubic centimeter Haake mixer (available from Thermo Scientific as HAAKE Polylab OS) having two sigma rotors rotating in opposite directions. The HDPE used in these Examples is the same as is used in Comparative Examples A through D as described in Table I. The HDPE-g-MCR-M17 used in these Examples is the same as is used in Example A as described in Table IV. The mixer blends the material at 180° C. for 8 minutes at 60 rpm, thereby producing a blend of polymerized siloxane grafted high density polyethylene and high density polyethylene. The resulting material is withdrawn from the mixer and cut into pellets. The pellets formed according to these Examples are subsequently formed into a polymer plate and then a foam as described herein.

TABLE V

| Example | Material | Producer (polymerized siloxane) | Product Specifications (polymerized siloxane) |
|---|---|---|---|
| Example E | 15% HDPE-g-MCR-M17/85% HDPE | Gelest Co. Ltd | MW = 5000, Mono-Methacryloxypropyl Terminated |
| Example F | 30% HDPE-g-MCR-M17/70% HDPE | Gelest Co. Ltd | MW = 5000, Mono-Methacryloxypropyl Terminated |

A given sample of polymer pellets are prepared into a polymer plate according to the following procedure. 50 g of pellets formed according to one of the several Examples are placed in a mold in a hot plate compression molding machine (Platen Vulcanizing Press, manufactured by Guangzhou NO. 1 Rubber & Plastic Equipment Co. Ltd.) and held at 150° C. for 5 minutes. The pellets are then placed under 15 MPa of pressure for 10 minutes to produce a polymer plate having the dimensions 15 mm by 10 mm by 1 mm. The polymer plate is an example of a molded intermediate.

A polymer plate is prepared into a foam according to the following procedure. A polymer plate formed according to one of the several Examples is stood on end in a pressure vessel on a thin layer of glass wool which rests on top of the aluminum plug. The pressure vessel is heated to 145° C. for 30 minutes. The pressure vessel is next heated to the foaming temperature for 1 hour (the foaming temperature for the respective polymer plates is listed in Table VI). The pressure in the pressure vessel is then increased to 33.1 MPa by charging the vessel with a pressurized atmosphere comprising the foaming agent (the foaming agent for the respective polymer plates is listed in Table VI) and held at this pressure and at the foaming temperature for 2 hours. The pressure vessel is rapidly vented, thereby depressurizing the pressure vessel, and the foamed sample is collected from the pressure vessel.

A polymer plate prepared according to the preceding Examples is prepared into a foam according to the following procedure. The polymer plate is stood on end in a pressure vessel on a thin layer of glass wool which rests on top of an aluminum plug. The pressure vessel is next heated to 145° C. for 30 minutes. The pressure vessel is next heated to the foaming temperature for 1 hour (the foaming temperature for the respective polymer plates is listed in Table VI). The pressure in the pressure vessel is then increased to the saturation pressure (the saturation pressure for the respective polymer plates is listed in Table VI) by charging the vessel with a pressurized atmosphere comprising the foaming agent (the foaming agent for the respective polymer plates is listed in Table VI) and held at this saturation pressure and at the foaming temperature for 2 hours. The pressure vessel is rapidly vented, thereby depressurizing the pressure vessel, thereby preparing a foamed sample which is collected from the pressure vessel.

The cell size of the foam samples is calculated by fracturing the foam following cooling with liquid nitrogen. The fractured foam is coated with iridium and images are obtained using scanning electron microscopy (SEM). The average cell size is calculated by analyzing the images using Image-Pro Plus software available from MediaCybernetics, Inc. The average cell size is listed in Table VI.

TABLE VI

| Example | Foaming Temp (° C.) | Saturation Pressure (MPa) | Foaming Agent | Porosity (%) | Cell Size (μm) |
|---|---|---|---|---|---|
| Comp Ex A | 124 | 33 | $N_2$ | 57 | >100 |
| Comp Ex B | 124 | 33 | $CO_2$ | 69.7 | <20 |
| Comp Ex C | 100 | 33 | $CO_2$ | 92.3 | <20 |
| Comp Ex D | 127 | 22 | $CO_2$ | 76 | <25 |
| Comp Ex E | 124 | 33 | $CO_2$ | 71.9 | <20 |
| Comp Ex F | 124 | 33 | $CO_2$ | 72.1 | <20 |
| Comp Ex G | 127 | 22 | $CO_2$ | 78.2 | <25 |
| Comp Ex H | 127 | 22 | $CO_2$ | 77.3 | <25 |
| Comp Ex I | 124 | 33 | $CO_2$ | 75.1 | <20 |
| Comp Ex J | 127 | 22 | $CO_2$ | 76.5 | <15 |
| Ex A | 124 | 33 | $CO_2$ | 82 | <10 |
| Ex B | 124 | 33 | $CO_2$ | 79.3 | <10 |
| Ex C | 127 | 22 | $CO_2$ | 82.6 | <10 |
| Ex D | 127 | 22 | $CO_2$ | 79.6 | <10 |
| Ex E | 124 | 33 | $CO_2$ | 73.1 | <10 |
| Ex F | 124 | 33 | $CO_2$ | 78 | <10 |

The data presented in Table VI illustrates that the foams prepared according to the Examples have an improved combination of Porosity and Cell Size as compared to the Comparative Examples. For example, none of the Comparative Examples achieved a Cell Size better than <15 μm, while all of the Examples achieved a Cell Size of <10 μm. The Examples illustrate that a foam prepared from polyethylene grafted polymeric siloxane provides a higher porosity and smaller cell size as compared to a foam prepared from pure polyethylene or a blend of polymeric siloxane and polyethene.

In Table VI, porosity is calculated based on the density of the foamed resin and the density of the resin prior to being foamed according to the equation $\phi = 1 - \rho/\rho_0$, where $\phi$ is the porosity, $\rho$ is the foam density and $\rho_0$ is the density of resin prior to being foamed. The densities were measured according to known practices for measuring the density of polymer foams, such as ASTM standard D792-00.

What is claimed is:

1. A foam comprising:
   a polymeric matrix comprising polyethylene grafted polymerized siloxane, and
   a plurality of cells formed in the polymeric matrix and containing a blowing agent comprising carbon dioxide, wherein the polymerized siloxane is selected from the group consisting of:
   (A) a vinyl-terminated diethylsiloxane-dimethylsiloxane copolymer having the Formula (III)

(III)

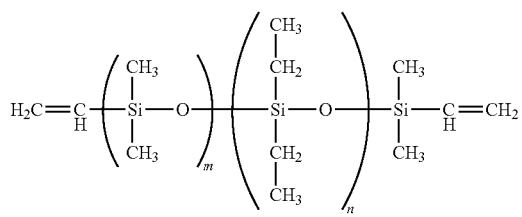

where:

m=77-185;

n=17-52; and the mole percent of diethylsiloxane is 18 to 22 percent, and (B) a symmetric Methacryloxypropyl Terminated Poly-Dimethylsiloxane having the Formula (VII)

(VII)

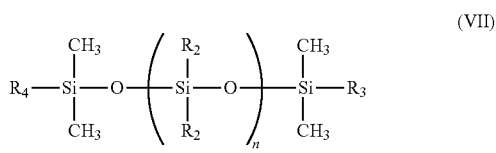

where:

n=8-130;

$R_3$=

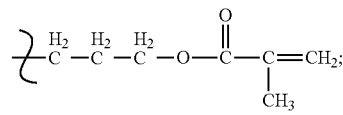

and $R_4$=

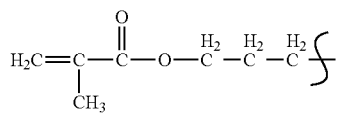

$R_2$=$CH_3$; or $C_2H_5$.

2. The foam of claim 1, wherein the polyethylene is low density polyethylene.

3. The foam of claim 1, wherein the polyethylene is high density polyethylene.

4. The foam of claim 1 wherein the foam has a porosity greater than 75 percent.

5. The foam of claim 1, wherein the mole percent of polymerized siloxane is from 0.5 to 10 percent of the polymeric matrix.

6. The foam of claim 1, wherein the polymeric matrix comprises a blend of polyethylene and polyethylene grafted polymerized siloxane.

* * * * *